United States Patent [19]

Wortman

[11] 4,079,568
[45] Mar. 21, 1978

[54] METHOD FOR FORMING FIBER-FILLED ARTICLES

[76] Inventor: Harold Wortman, 5936 Monroe St., Morton Grove, Ill. 60053

[21] Appl. No.: 691,350

[22] Filed: Jun. 1, 1976

[51] Int. Cl.$^2$ .......................... B65B 9/02; B65B 15/00
[52] U.S. Cl. .......................................... 53/23; 53/35; 5/341
[58] Field of Search ................... 53/23, 116, 117, 139, 53/35; 5/341, 343, 345

[56] References Cited

U.S. PATENT DOCUMENTS

| | | | |
|---|---|---|---|
| 1,133,686 | 3/1915 | Weinberg | 53/23 |
| 1,208,889 | 12/1916 | Anderson et al. | 5/345 R |
| 1,497,183 | 6/1924 | Mitchell | 53/23 |
| 2,539,395 | 1/1951 | Banks | 53/23 X |
| 2,581,561 | 1/1952 | Shaw | 53/23 X |
| 2,741,009 | 4/1956 | Slayter et al. | 53/116 X |

*Primary Examiner*—Travis S. McGehee
*Attorney, Agent, or Firm*—Alter and Weiss

[57] ABSTRACT

A method for fabricating fiber-filled articles in which a single emanating column of continuous synthetic crimped tow is produced, cut and utilized to form the article without conventional processing and treatment. The invention includes the method for fabricating these articles as well as an apparatus for forming fiber-filled articles in which columnar bundles of continuous crimped tow are either wrapped in fabric sleeve tubes or are used independently of sleeves. The continuous crimped tow of synthetic fibers is used as a filler directly as it emanates from the tow processing equipment, without the need for layering, spraying, or precutting between an article's outer material layers. The "modular" independent columns of restrained tow are attached in combination to form filber-filled products such as quilts, c;omforters, and sleeping bags imparting to the apparatus and process the advantages of high production fabrication.

12 Claims, 11 Drawing Figures

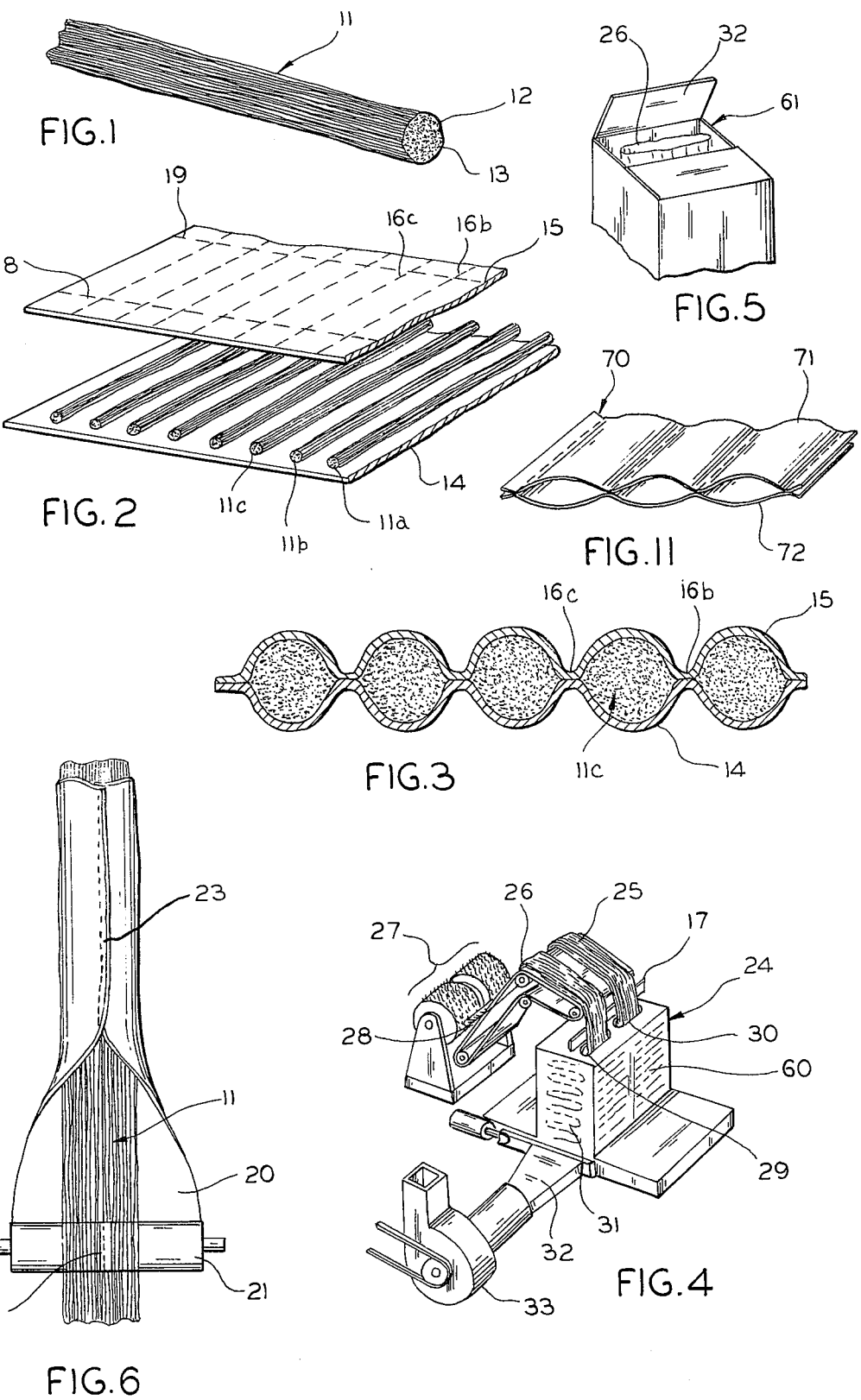

U.S. Patent   March 21, 1978   Sheet 2 of 2   4,079,568
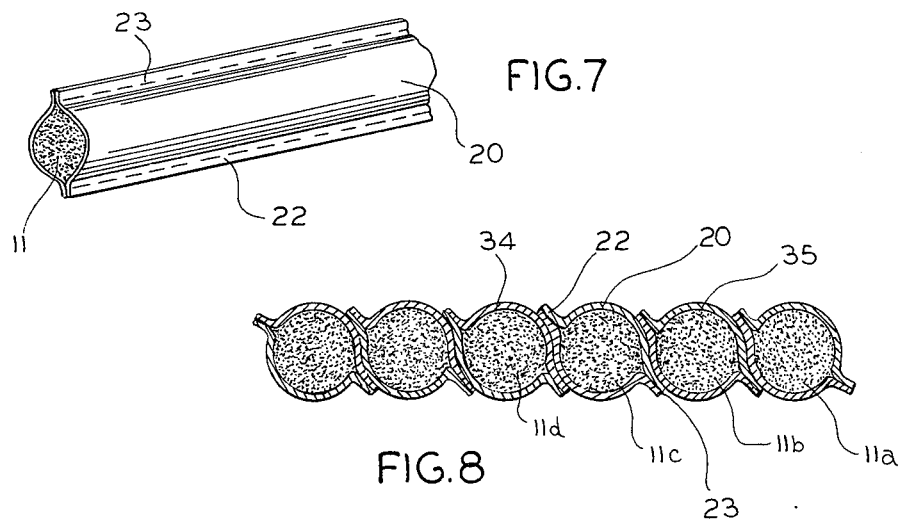
FIG.7
FIG.8
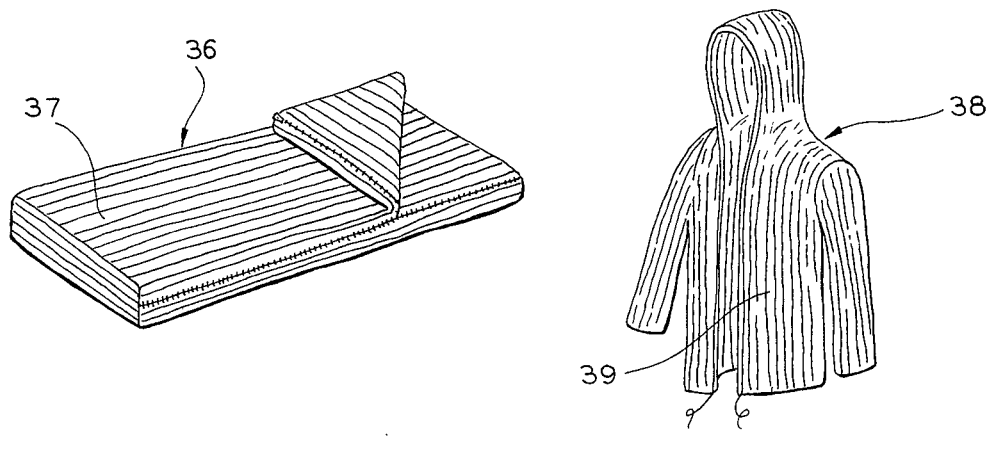
FIG.9
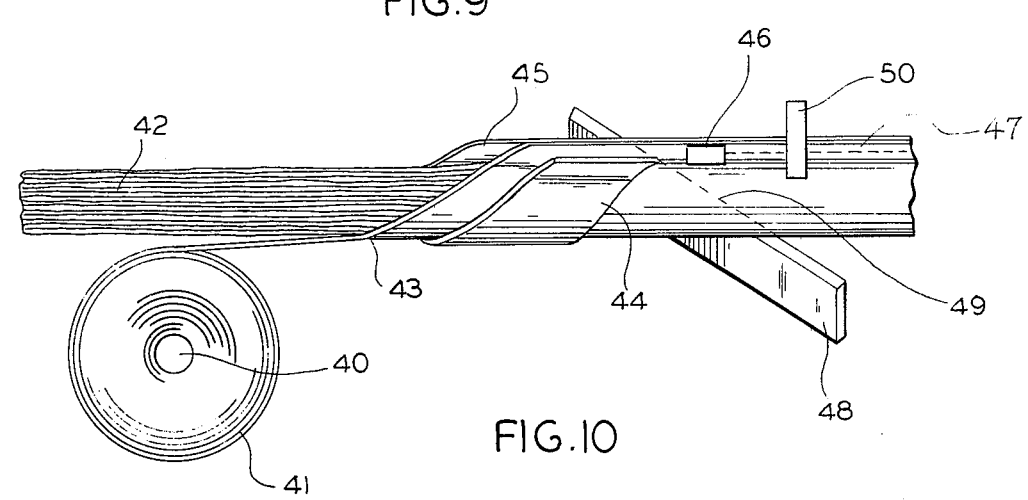
FIG.10

METHOD FOR FORMING FIBER-FILLED ARTICLES

BACKGROUND OF THE INVENTION

This invention relates in general to the manufacture of textile goods and in particular to a method and apparatus for forming synthetic fiber-filled articles, such as quilts, comforters, and sleeping bags.

In their earlier stages of fabrication material-filled articles, such as sleeping bags, comforters and quilts were filled with materials such as down and natural fiber. Recently, however, it has been discovered that such articles can be more easily and inexpensively fabricated with synthetic fiber materials. The use of these conventionally prepared synthetic fibers imparts to such an article advantages in the areas of reduced weight, ease in washability, and expense. High bulk synthetic materials, such as these, have been conventionally producible in great volume through automatic machinery and have been able to impart to the quilted article, the characteristics of warmth for the user and softness.

The synthetic fiber material is conventionally produced in continuous fibers by fiber-generating equipment. Thousands of these fiber strands are then crimped together after they are spun, then cut in lengths of a few inches so as to approximate the texture and length of natural fibers so that these synthetic fibers can then be processed by existing machinery originally designed to process the natural fiber materials. Thus, the newer continuously spun synthetic materials were given the characteristics of natural fibers so that natural fiber fabricating machinery could continue processing these materials into filler for the articles herein described.

Even more recently, continuous strand synthetic fibers have been utilized as an article-filling substance without the necessity of the preliminary step of shearing the synthetic fibers so as to appropriately imitate the characteristics of natural fibers. One such conventional practice utilizes a "crimped" tow of continuous synthetic filament in which the orientation of the composite fibers is broken up so that the crimps no longer nest in the same position as to where they were placed. This is usually performed through the use of an air spray which flattens an initial emanating tow of continuous tow as disclosed in Watson, U.S.Pat. No. 3,681,796. After this operation, the continuous crimped tow is layered in a crosslap which must be sprayed in a latex or other coating spray, then trimmed and rolled. The spraying process is performed to restrain the orientation of the synthetic bundles of fibers and to thus avoid shifting or piling, or bulking at a particular point in the article in which the synthetic fiber material is urged.

Only at this stage, after the synthetic fibers have been totally processed, can the bulk synthetic material or fiber bundles be sandwiched between layers of article fabric, at which time the fiber material is restrained into pockets formed by stitching so as to further reduce shifting of the filler in conventional quilting operations while maintaining the thickness of the filler in a homogenous manner.

An even more recent apparatus and process for making quilted articles is disclosed in Lipe, U.S.Pat. No.3,673,036. In this particular process crimped multi-filament tow is opened, spread, and delivered to pneumatic propelling devices which discharge the tow without further processing into a pre-sewn and pocketed quilt shell. After the proper amount of filler fibers have been delivered, the open ends of the pre-formed package are sewn shut so as to yield an article of quilted construction without intermediate shearing, without placement into natural fiber equipment and without the necessity for layering, spraying and sewing after the fiber filler is sandwiched between the outer sheets of the article fabric. But even this method has its drawbacks in that the conventional fabrication techniques for the actual attachment of the article's exposed material must be followed before the emanating two is inserted, consisting of the sewing of the two outer layers, prior to the fiber filling operation. The process requires the simultaneous operations of tow fabrication and article filling. Similarly, the fiber filling processing operation must be started and stopped for every separate article between the fiber filling and quilt sealing operations, thus reducing the productivity of the overall operation.

In yet other quilt filling methods, batts must be formed of a plurality of emanating synthetic tows towards use in an article as disclosed in Gamble U.S. Pat. No.3,071,783. It is thus an object of the present invention to utilize a continuous emanating crimped synthetic fiber tow without the intermediary operations of cutting, disorientating, layering, and spraying.

It is further an object of the present invention to allow the manufacture of a continuous length of fabric-surrounded synthetic crimped two approximating a narrow quilted column which can thereafter be combined with other severed quilt columns to fabricate a quilted article without combining a plurality of tows in a batt preliminary to the filling operation.

It is also an object of the present invention to either securely restrain an encapsulated synthetic tow within a preliminary sleeve, or enable utilization of the unprocessed tow directly into an article while avoiding the bunching, bulking or shifting of the continuous fibers within the tow, and at the same time facilitating the placement of such continuous tow fiber filler within a quilted article.

Additionally, it is an object of the present invention to enable production of the tow in a usable manner at a high rate of fabrication which is easy to handle when the article is eventually prepared and which lacks the undesirable characteristics of conventional sprayed fiber fillers, which often comprise reduced expanding qualities, stiffness, and poor draping effects.

Further, it is an object of the invention to utilize novel tow packaging and containment concepts in a somewhat similar manner to the containment and pillow formation concepts set forth in my earlier invention, U.S. Pat. No. 3,878,873, to enable manufacture of the tow and then subsequent fabrication of the fiber-filled articles apart from the manufacturing process after the tow has been transported to the destination at which fabrication is being performed. The method for packaging and containment herein disclosed is utilized for the objects of efficiently packaging a substantial quantity of the bulky tow in a minimum of packaging space while at the same time avoiding the permanent crushing or deformation of the tow so that the tow has nearly its original shape, bulk and resilience after removal from its packaging container.

These and other objects of the invention will become apparent as herein disclosed.

SUMMARY OF THE INVENTION

The present invention is an improved method and apparatus for forming fiber-filled articles.

The method of manufacturing the fiber-filled articles, such as apparel, quilts, comforters and sleeping bags, utilizes a plurality of columns formed of continuous crimped synthetic fiber tow. The steps include processing a singular column of continuous crimped synthetic fiber tow, collecting this singular column of tow as it emanates from conventional towfabricating machinery, cutting the column of tow into a plurality of tow segments, each having a desired length for inclusion into the article, and encapsulating this plurality of tow segments between a plurality of surface material layers which, in the preferred embodiment, are the inner and outer material surfaces of the article being filled.

In the preferred embodiment of the invention the collecting of the singular column of synthetic fiber tow comprises the intermediary step of packaging and containing the emanating tow for distribution of the tow to any location, apart from the tow-producing machinery, at which filling of the fiber-filled articles is to be conducted. It should be realized that the methods of article manufacture herein described lend to the severability of the article making and tow fabricating processes.

The method through which such packaging and containment is accomplished include the steps of: (1) directing the emanating tow from the machinery on which it is being fabricated; (2) placing a packaging cavity under a negative pressure so as to effectively draw the tow into the cavity under force; (3) layering the tow within the cavity under a desired drawing pressure; (4) filling the cavity to a desired level with this entering tow; (5) severing the tow at a desired point after the filling of the cavity under negative pressure for direction of the remaining tow to subsequent packaging and containment operations; and (6) securing the contained packaged tow in the cavity, thereby enabling the distribution of the packaged tow to any location at which the steps of article fabrication are to be performed.

The actual encapsulation of the plurality of tow segments is accomplished through arranging the plurality of tow segments between the plurality of fiber-filled article surface materials, thereby sandwiching the individual lengths of tow between these surface materials. In one embodiment of the invention, this arranging is followed by the attachment of the surface layers of material to one another, thereby encapsulating, positioning, and/or pocketing the sandwiched tow into a restrained position between the layers of article surface material. The encapsulating and restraining operation towards securely and fixedly positioning the plurality of tow segments within or between the surface layer further comprises the step of stitching the ends of the plurality of tow segments through the plurality of article surface materials, thereby constraining the continuous filaments of the crimped tow into a fixedly restrained position relative to the surface material. This operation reduces the tendency of the individual tow segments towards shifting, lumping and riding up within their sandwiched or encapsulated positions. As can be seen, the restraining operation similarly maintains the tow in place so as to improve the draping effect of the fiber-filled article, as well as its washability and durability.

In yet another embodiment of the invention the surface materials are pre-sewn with vacant tow compartments and the arrangement of the tow within is accomplished by pulling the tow through these pockets by hook, for example, until the compartments are occupied by tow lengths as desired. In this embodiment, also, the outside edges of the article would be stitched to constrain the tow in its position relative the surface material.

In another embodiment of the method for fabricating fiber-filled articles, the step of collecting the tow further comprises an intermediary wrapping of the tow itself within a fabric sleeve which surrounds the tow in a tubular fashion, thereby imparting to the emanating tow the characteristics of easier handling, and initial secured restraining of the tow, even before it is channeled between the surface layers of the article's surface materials.

This is accomplished by receiving the synthetic fiber continuous tow from the fiber-generating machinery at a predetermined rate in the form of a dense columnar bundle of synthetic continuous fiber. This emanating tow fiber is then enveloped in fabric sleeve material which is wrapped around the emanating tow and fastened in a wrapped position around the tow so as to securely restrain the tow within the periphery described by the sleeve. When the desired length of sleeve-wrapped tow is developed, a wrapped fiber-filled column is severed from the remaining emanating and wrapped tow at a desired length for use within the fiber-filled article. These sleeve-enveloped tow segments can be utilized in the preparation of a fiber-filled article in one of two preferred way.

The first method through which these sleeve-wrapped or enveloped tow segments can be used comprises a method equivalent to the restraining technique utilized on the non-wrapped sleeve tows. This includes the placing of the sleeve-wrapped or enveloped columnar tow in a sandwich fashion between a plurality of article surace materials followed by the operation of securing the surface materials together, thereby encapsulating or constraining between said materials, the plurality of columnar-wrapped fiber bundles. A second and more facilitated manner for fabricating the fiber-filled article comprises the step of merely attaching the plurality of columns of enveloped tow to one another for integration of these columns themselves into the fiber-filled article itself. As can be realized, if the emanating continuous tow were wrapped in a sleeve material made of the same fabric that the outer surface materials of the article to be filled was made, then the manufacture of the article itself would not even require the sandwiching or encapsulating of the separate tow segments between the surface materials for subsequent sewing. Quite to the contrary, a quilted article can be prepared in a modular fashion by successively attaching the already wrapped columns of tow to each other in a manner so as to "build" or construct the fiber-filled article from these modular elements. Thus, the intermediary fabrication step of placing the material down, lining up the columns of wrapped or unwrapped tow, placing a second layer of material on top as to sandwich the tow, followed by stitching and sewing could be superceded by the facilitated fabrication of utilizing the material-wrapped columns successively attached to form the article itself.

The invention includes an apparatus which fabricates the enveloped fiber-filled columns of continuous synthetic fiber crimped tow emanating from conventional tow-processing means. The tow emanates from the processing means as a dense column of bundled continuous synthetic fibers. As these continuous crimped fibers emerge in the form of a dense tow, fabric sleeve dispensing means, proximate to the processing equipment, distributes a fabric sleeve material on one side of the tow at a rate of speed substantially equal to the rate of speed at which the tow emanates from the processing equipment. However, by adjusting the rate at which the fabric sleeve is dispensed, it is possible to stretch the emanating tow along the side of the fabric sleeve material when the fabric sleeve materials is being dispersed at a faster rate of speed.

The fabric sleeve material which is being dispensed is directed around the emanating tow so as to envelop it by a plurality of darted forming fixtures, for example, which merge the opposite edges of the fabric sleeve material into contact with one another, thus encircling and surrounding the columnar tow and thus enabling the facilitated attachment of the opposite edges of the sleeve material by sleeve attachment means. These fabric sleeve attachment means not only secure the fabric sleeve material in a tubular fashion around the emanating continuous tow, but are also used to cap-off the end portions of the sleeve-wrapped tow to keep the continuous fibers from riding up or shifting within the enveloping sleeve. These attachment means are used to secure the ends of the column only after a predetermined, desired length of sleeve-wrapped tow is severed from the remaining emanating tow and dispensed material following closely behind it.

The preferred embodiment of the invention utilizes tow fabricated by conventional synthetic fiber-generating spinnerets and nozzles which collectively generate a high volume of individual filaments. Before the tow emanates from the processing equipment the filaments are automatically gathered and crimped into a continuous homogenous tow.

The fabric sleeve material is dispensed alongside the tow, proximate to the point of emamation and is released at a rate equal to that rate of the emanating tow closely adjacent to the tow, enabling the tow and the sleeve, together in proximate position, to be generated at the same time.

It is important to note that the fabric sleeve attachment means can comprise one of several different securing techniques. For example, stitching and sewing can be used to secure the sleeve around the emanating tow, as well as the ends, or heat and pressure or ultra-sonic vibration welding can be substituted, as known in the industry, for the stitching and sewing operation and for imparting speed and efficiency to the fabricating process. Once a desired length of emanating tow wrapped in sleeve fabric has been prepared and has reached the desired length, severing means, comprising a slicing device, such as a shear, proximate to the sleeve attachment means disconnects the sleeve-wrapped column of continuous tow from the remainder of tow and sleeve material going through the wrapping process.

In the preferred embodiment of the invention the opposite edges of the fabric sleeve materials are attached at such a point the columnar emanating tow so as to leave an exposed tab or seam of material to protrude from the wrapped column. This exposed seam or tab runs the entire lateral dimension of the column to facilitate the attachment of this fabricated column to a plurality of similarly formed other columns which, in combination, can form the fiber-filled article. Thus, it can be seen that the present invention prepares a modular or component quilt column on a continuous production basis for further incorporation of these separate quilt columns into desired articles, such as sleeping bags, quilts, and comforters, or prepares an easier to handle, durable tow column for sandwiched placement between surface materials, as previously discussed.

While the sleeve wrapping technique can be utilized in conjunction with the tow fabricating means, it is readily apparent that the wrapping process itself is severable from the tow manufacturing process. Thus, fabricated and packaged tow for example, can be sent to a remote location and utilized "as is" in the sleeve wrapping process since the process itself is not dependent on the emergence of the tow from the fabricating machinery.

BRIEF DESCRIPTION OF THE DRAWINGS

FIG. 1 is a side perspective view of continuous crimped synthetic fiber tow.

FIG. 2 is a side perspective view of the use of a plurality of tow columns sandwiched between a plurality of material surfaces;

FIG. 3, is a front cross-sectional view of a portion of quilted object utilizing the construction herein described in FIG. 2.

FIG. 4 is an upper perspective view of the apparatus utilized for packaging and cotainerizing an emanating synthetic tow;

FIG. 5 is a perspective view of the upper portion of an opened container into which the synthetic tow has been packaged;

FIG. 6 is a top plan view illustrating in particular the envelopment of emanating synthetic tow by a wrapping sleeve;

FIG. 7 is a side perspective view of one embodiment of the sleeve enveloped tow;

FIG. 8 is a front plan cross-sectional view of an article formed by modular-wrapped tow sections;

FIG. 9 is a perspective view of several fiber-filled articles utilizing the construction method and apparatus described herein;

FIG. 10 is a side perspective view of the sleeve wrapping apparatus; and

FIG. 11 is a side perspective view of a pre-sewn article surface layer exterior forming compartments for insertion of tow.

DETAILED DESCRIPTION

While this invention is susceptible of embodiment in many different forms, there is shown in the drawings and will herein be described in detail, several specific embodiments, with the understanding that the present disclosure is to be considered as an exemplification of the principles of the invention and is not intended to limit the invention to the embodiment illustrated.

A continuous column of synthetic crimped tow 11 is shown in FIG. 1 as are sample continuous length fibers 12 and 13 within the tow. Preliminary to utilization in the present invention, the tow is a synthetic bundle of fibers which have been crimped, separated, de-registered and formed into a column.

In the preferred embodiment of the invention, wherein the tow is used directly as it emanates from the processing machinery without utilization of a sleeve wrapped about it, the tow, which is cut into tow segments of desired length, is used as is for a fiber-filled article, as shown in FIG. 2. As can be seen, typical tow segments, 11A, 11B and 11C, are shown in placement upon article surface material 14. In this embodiment, the crimped fiber-filled article is formed by sandwiching in, and encapsulating tow segments 11A, B, C, etc. through placement of a second material surface 15 directly over the tow segments aligned surface material 14. The patterns of stitching which will be followed on proper placement of surface material 15 over surface material 14 and the encapsulated tow is also shown in FIG. 2 by a series of dash-lines on the upper surface of surface material 15. Once surface material 15 is in place over surface material 14 and the tow segments, stitching in the longitudinal direction as shown by sample stitches 16b and 16c is performed, thereby pocketing-in and encapsulating the various tow separate segments. In order to provide additional restraint of the tow segments between the two surface materials 14 and 15, stitching is performed along dash-lines 18 and 19 which secure the ends of the columnar tow segments so as to maintain the segments in place, to provent riding, lumping, and shifting of the tow segments within the surface material and to impart durability and improved washability to the article thereby constructed. It is important to note that while stitching patterns 16b and 16c, etc. attach surface material 15 to surface material 14 without penetrating any of the tow segments therein sandwiched, stitching along lines 18 and 19 will, in fact, preferably, penetrate not only the sandwiched materials 14 and 15, but also penetrate and secure therewithin the actual ends of the columnar tows. While, in this preferred embodiment, attachment of the surface materials and the tow segments is referred to in terms of stitching and/or sewing, it should be realized that virtually any attachment method, such as vibrational welding or heat and pressure for durable plastic materials can similarly be utilized in the same manner as stitching and sewing.

Once stitching and sewing is performed on the article so described by FIG. 2 it should be realized that the extending edges of surface materials 14 and 15 could be additionally secured so as to effectively seal the quilting fibers within the surface layers to more appropriately yield the finished product. As previously mentioned, the tow can be encapsulated in yet another embodiment by pre-forming the surface materials as shown in FIG. 11. Here, encapsulating the tow is achieved by pulling the tow itself through pre-sewn surface materials 71 and 72 by a hook, or other means.

FIG. 3 of the drawings illustrates the invention discussed in FIGS. 2 and 11 in its secured or stitched form by displaying a cross-sectional view which clearly shows surface materials 14 and 15 securely attached by stitching or equivalent means at locations 16b and 16c, for example. Unprocessed continuous synthetic tow, such as that shown by 11c is securely encapsulated within the pockets defined by the stitching and is securely restrained at each of the respective ends of each segment by stitching or attachment means penetrating the tow segments themselves, not shown, however, in FIG. 3.

As previously discussed, in combination with the preferred embodiment of the invention the collecting operation wherein the singular column of emanating synthetic fiber tow is processed, further comprises the intermediary step of packaging and containing the emanating tow for distribution of the tow to any location at which filling of the fiber-filled articles is to be conducted. FIG. 4 of the drawings illustrates just such a collecting, packaging and containing system which can be used with the tow-processing machinery to afford these features. As can be seen, tow-directing rollers 27 which are capable of being placed adjacent to the tow emanating means of the processing equipment, direct the tow, or in this case, double-tow portions 25 and 26, up conveyor means 28 which position the ends of the tow directly over apertures 29 and 30 in vacuum chamber 24. Within vacuum chamber 24 is an air-penetrable casing which is therein supported and the chamber 24 is provided with vacuum means 32 and 33 through which a negative pressure or desired suction force is applied to both chamber 24 and air-penetrable casings 31 and 60. Double tow columns 25 and 26 are virtually forced into casing 60 and 31 respectively when vacuum means 32 and 33 are applied. Columns 25 and 26 are compactly and efficiently layered back and forth so as to fill casings 60 and 31 up to a desired extent. When the desired volume of tow columns 26 and 26 have thereby filled casings 60 and 31 respectively, tow severing means 17, such as a heating device or blade, severs the tow columns. Obviously, the operation can involve the simultaneous filling of two separate casings within the machine, or can be operated alternatively with one casing being filled while the other is being prepared or, for that matter, can involve more vacuum chambers and filling apertures. Similarly, the tow itself can be positioned over apertures 29 and 30 without a conveyor belt since it is continuous in nature.

After the casings 60 and 31 have been filled with the continuous synthetic fibers, the casings are removed and either used themselves as containers or subsequently packaged in cardboard or other conventional packaging containers for shipment.

Such a container, 61 is shown in FIG. 5 displaying compressed tow 26 which is in view due to the opening of flap 32 on the packaging container 61. This particular method and operation for containerizing and packaging the tow enables safe shipment of the tow to any other location for placement into quilted objects as herein described while at the same time, enables complete and efficient filling of the container with an otherwise bulky and hard-to-ship item, and further maintains the tow in a desirable manner so as to reduce the possibilities of snagging, over compression and loss of resilience.

Another embodiment of the invention is disclosed in FIG. 6 in which tow column 11 is wrapped in fabric sleeve 20 preliminary to its use in a fiber-filled article. As can be seen, sleeve-dispensing apparatus 21 around which fabric sleeve material 20 is wrapped is dispensed at approximately the same rate of speed at which tow 11 is generated from the processing equipment. It is important to note, however, that the speed of the fabric sleeve dispensing can be increased or decreased for the purpose of stretching or bulking the emanating tow as it is wrapped. In the preferred embodiment of the sleeve wrapping technique, the sleeve fabric itself, before enveloping the tow, is produced with a jutting seam 22 on its one side. As it is dispensed around tow 11, it is secured by joining its two ends together at seam 23, which, in a similar fashion to seam 22, juts from its tubular construction. The resulting enveloped tow segment 11 is shown in FIG. 7 wherein jutting seams 22 and 23 are shown resulting from the previously discussed method in which sleeve fabric 20 is made to envelop syntehtic continuous tow 11.

Once such a sleeve-wrapped tow segment is produced, such as shown by FIG. 7, an article can be constructed in either one of two preferred ways. The sleeve-wrapped tow can be used in in accordance with the principles of the first preferred embodiment as shown by FIGS. 2 and 3, wherein the wrapped tows are now individually positioned and thereafter sandwiched, or the sleeve-wrapped tows can be used in yet another even more facilitated method for fabricating quilted fiber-filled objects FIG. 8 of the drawings discloses the second method for fabricating the fiber-filled articles wherein each sleevewrapped tow segment is utilized as a modular element in the fabrication of the article without the need for further sandwiching between the plurality of surface materials. As shown in FIG. 8, tow segment 11c, for example, surrounded by sleeve 20 can be attached to other sleeve-wrapped tow segments by securement of its seamed tab 23 to sleeve 35 of an adjacent tow segment 11b and further by attachment of seamed tab 22 to sleeve 34 of a further adjacent tow segment 11d. In such a manner, a whole series of individual modular tow segments can be attached to one another to prepare a quilted article without the need for preliminary placement between separate surface materials and subsequent attachment thereto. Some articles which may be fabricated by this method or by the previously discussed method as shown in FIG. 9, wherein sleeping bag 36 uses a plurality of columns such as tow column 37 and insulated parka 38 uses a plurality of encapsulated tow column such as tow column 39.

The sleeve envelopment process is more clearly shown in FIG. 10 of the drawings wherein dispensing roller 40, having sleeve fabric 41 wrapped around, dispenses sleeve fabric 41 at merger point 43 at which fabric 41 intersects emanating tow 42. Forming darts 44 and 45 lift the opposing edges of the sleeve fabric and guide the fabric up and around the circumference of the emanating tow 42. When these two opposing ends finally meet after travelling the entire circumference of the emanating tow, they are stitched by stitching means 46, yielding abutting tab seam 47 for subsequent placement of the sleeve-wrapped tow segment to other similarly formed tow segments. When a desired length of sleeve-wrapped tow is thusly fabricated, cutting means 48 severs both the tow and sleeve material at cutting position 49. The end of the column of tow is then securely restrained from bunching, shifting, etc. within the sleeve fabric itself, by stitching substantially perpendicular to the tow column direction with stitching means 50 through both the sleeve material and the synthetic tow fibers. This has the purpose of restraining the front and rear ends of tow segments within the tubular sleeve material for the purposes herein described. As previously mentioned, the sleeve-wrapped emanating tow can now be utilized in the fabrication of a quilted article by either sandwiching it between two surface materials as shown in FIGS. 2 and 3, or by modularly attaching one tow segment to another so as to form the overall quilted article.

The foregoing description and drawings merely explain and illustrate the invention and the invention is not limited thereto, except insofar as the appended claims are so limited, as those skilled in the art have the disclosure before them will be able to make modifications and variations therein without departing from the scope of the invention.

What is claimed is:

1. A method for manufacturing fiber-filled articles, such as apparel, quilts, comforters and sleeping bags utilizing a plurality of columns of continuous crimped synthetic fiber tow comprising the steps of:
   (a) Processing one or more columns of said continuous crimped synthetic fiber tow;
   (b) Collecting said one or more columns of tow;
   (c) Cutting said one or more columns of tow into a plurality of tow segments of a desired length; and
   (d) Encapsulating said plurality of tow segments within a plurality of fiber-filled article surface materials so that said tow segments are fully enveloped by said article surface materials, and
   (e) Affixing one or more of said tow segments to one or more of said plurality of article surface materials thereby restraining the position of said tow segments within said surface material to reduce the shifting, lumping and riding up of said synthetic tow fibers.

2. The method of claim 1 wherein said collecting of said one or more columns of synthetic fiber tow comprises the intermediary step of packaging and containing the processed tow for distribution of said tow to a different location for the performance of the remaining steps of the process.

3. The method of claim 2 wherein said method of packaging and containment comprises the steps of:
   (a) directing said processed tow to a packaging cavity;
   (b) placing said cavity under a negative pressure so as to effectively draw said tow into said cavity under force;
   (c) layering said tow within said cavity under said drawing pressure;
   (d) filling said cavity under said negative pressure with said tow to a desired level;
   (e) severing said tow for direction of the remaining tow to subsequent packaging and containment operation; and
   (f) securing said contained and packaged tow in said formed cavity thereby enabling distribution of said tow to any location at which the remaining steps of article fabrication can be performed.

4. The method of claim 1 wherein the step of encapsulating said plurality of tow segments comprises the steps of:
   (a) arranging said plurality of tow segments between said plurality of fiber-filled article surface materials so as to sandwich said tow;
   (b) attaching said surface layers of material to one another thereby encapsulating and positioning said sandwiched tow into restrained position between said layers.

5. The method of claim 1 wherein the step of encapsulating said plurality of tow segments comprises the steps of:
   (a) preliminarily attaching said surface layers of material to one another to form a plurality of tow compartments; and
   (b) drawing said tow into and through said plurality of tow compartments until said surface materials encapsulate said tow to a desired extent.

6. The method of claim 1 wherein the step of encapsulating said tow comprises the initial wrapping of said tow in a fabric sleeve material which surrounds said tow in a tubular fashion thereby imparting ease in handling and receivement of said fibers within said tow for use in said fiber-filled article.

7. The method of claim 6 wherein the method for initially wrapping said tow comprises the steps of:
   (a) enveloping said tow in said fabric sleeve material so as to wrap said sleeve material around said tow;

(b) fastening said sleeve material in a wrapped position around said tow so as to enable said sleeve material to securely restrain said tow within the periphery described by said sleeve material; and (c) severing said wrapped fiber-filled column to a desired length.

8. The method of claim 6 in which said method for encapsulating said tow further comprises the steps of:

(a) placing said sleeve enveloped columnar tow in a sandwiched fashion between said plurality of article surface materials; and (b) securing said surface materials together, thereby constraining between said materials said plurality of columnar-wrapped fiber bundles.

9. The method of claim 6 in which said method for encapsulating said tow further comprises the steps of:

(a) preliminarily attaching said surface layers of materials to one another to form a plurality of tow compartments; and (b) drawing said sleeve enveloped columnar tow into and through said plurality of tow compartments until said surface materials encapsulate said sleeve-enveloped tow to a desired extent.

10. The method of claim 6 in which said method for encapsulating said tow further comprises the step of attaching said column of enveloped tow to a plurality of similarly formed columns of enveloped tow for integration into said fiber-filled article, thereby utilizing said fabric sleeve as said article surface material.

11. A method for manufacturing fiberfilled articles, such as apparel, quilts, comforters and sleeping bags utilizing a plurality of columns of continuous crimped synthetic fiber tow comprising the steps of:

(a) Processing one or more columns of said continuous crimped synthetic fiber tow;

(b) Collecting said one or more columns of tow;

(c) Cutting said one or more columns of tow into a plurality of tow segments of a desired length; and (d) Encapsulating said plurality of tow segments within a plurality of fiber-filled article surface materials by:

arranging said plurality of tow segments between said plurality of fiber-filled article surface materials so as to sandwich said tow, attaching said surface layers of material to one another thereby encapsulating and positioning said sandwiched tow into restrained position between said layers, and stitching the ends of said plurality of tow segments through said plurality of article surface materials thereby constraining said continuous filaments of said crimped tow into fixedly restrained position relative to said surface materials and thereby reducing shifting, lumping, and riding up of said synthetic tow fibers.

12. A method for manufacturing fiberfilled articles, such as apparel, quilts, comforters and sleeping bags utilizing a plurality of columns of continuous crimped synthetic fiber tow comprising the steps of:

(a) Processing one or more columns of said continuous crimped synthetic fiber tow;

(b) Collecting said one or more columns of tow;

(c) Cutting said one or more columns of tow into a plurality of tow segments of a desired length; and (d) Encapsulating said plurality of tow segments within a plurality of fiber-filled article surface materials by:

preliminarily attaching said surface layers of material to one another to form a plurality of tow compartments;

drawing said tow into and through said plurality of tow compartments until said surface materials encapsulate said tow to a desired extent; and stitching the ends of said plurality of tow segments through said plurality of article surface materials thereby constraining said continuous filaments of said crimped tow into fixedly restrained position relative to said surface materials and thereby reducing shifting, lumping, and riding up of said synthetic tow fibers.

* * * * *

UNITED STATES PATENT AND TRADEMARK OFFICE
CERTIFICATE OF CORRECTION

PATENT NO. : 4,079,568
DATED : March 21, 1978
INVENTOR(S) : HAROLD WORTMAN

It is certified that error appears in the above-identified patent and that said Letters Patent are hereby corrected as shown below:

| | |
|---|---|
| Abstract-Line 16 | After quilts, delete "c;omforters" and insert instead --comforters--. |
| Col. 2, Line 11 | After "emanating" delete "two" and insert instead --tow--. |
| Col. 2, Line 29 | After "crimped" delete "two" and insert instead --tow--. |
| Col. 2, Line 68 | After "herein" delete "disclosed" and insert instead --described--. |
| Col. 4, Line 30 | After "preferred" delete "way" and insert instead --ways--. |
| Col. 4, Line 50 | After "or" delete "encapsulating" and insert instead --encapsulation--. |
| Col. 4, Line 59 | After "top" insert --so--. |
| Col. 5, Line 10 | After "being" delete "dispersed" and insert instead --dispensed--. |
| Col. 5, Line 60 | After "point" insert --around--. |
| Col. 6, Line 26 | After "and" delete "cotainerizing" and insert instead --containerizing--. |

UNITED STATES PATENT AND TRADEMARK OFFICE
CERTIFICATE OF CORRECTION

PATENT NO. : 4,079,568

DATED : March 21, 1978

INVENTOR(S) : Harold Wortman

It is certified that error appears in the above-identified patent and that said Letters Patent are hereby corrected as shown below:

Col. 8, Line 63      After "envelop" delete "synthehtic" and insert instead --synthetic--.

Signed and Sealed this

Fifth Day of September 1978

[SEAL]

Attest:

RUTH C. MASON
*Attesting Officer*

DONALD W. BANNER
*Commissioner of Patents and Trademarks*